Sept. 27, 1960 G. G. SPRATT 2,954,185
HELICOPTER TOWING APPARATUS
Filed June 19, 1957 3 Sheets-Sheet 1

INVENTOR
GEORGE G. SPRATT
BY
ATTORNEY

Sept. 27, 1960 G. G. SPRATT 2,954,185
HELICOPTER TOWING APPARATUS
Filed June 19, 1957 3 Sheets-Sheet 2
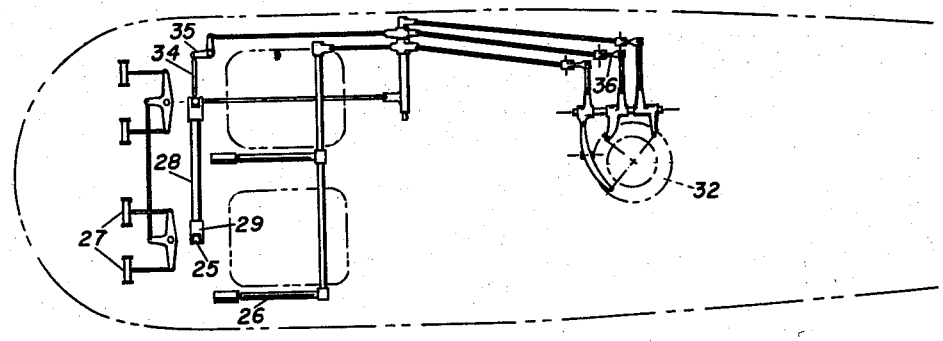
Fig. 3
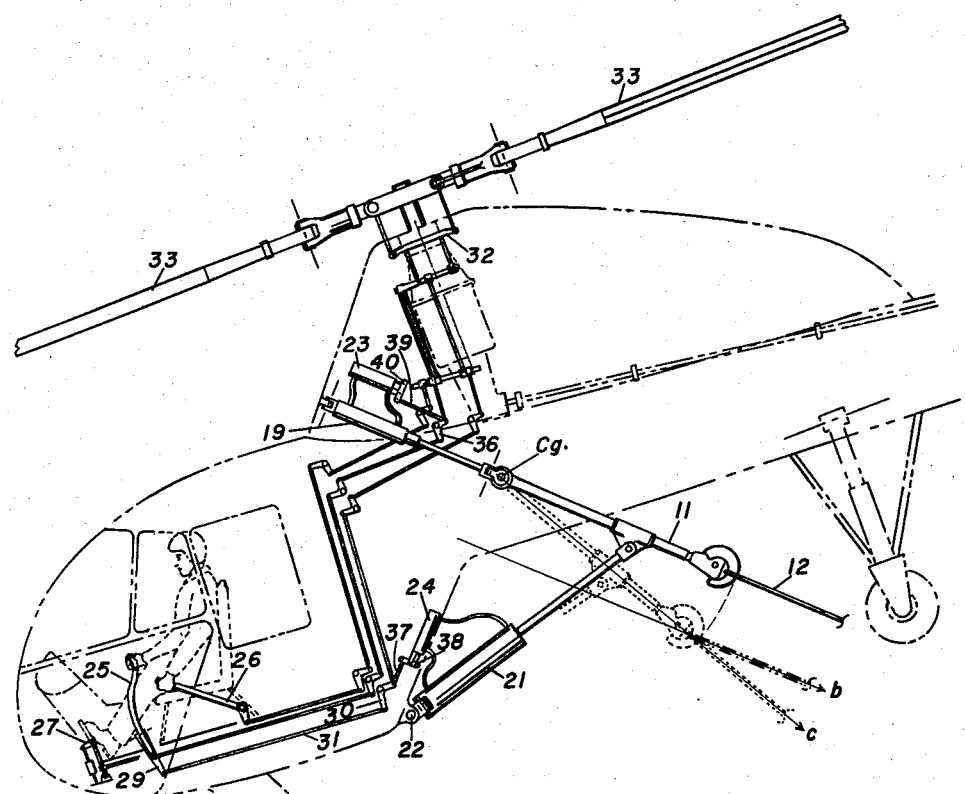
Fig. 2
INVENTOR
GEORGE G. SPRATT
BY 
ATTORNEY United States Patent Office 2,954,185
Patented Sept. 27, 1960

2,954,185

HELICOPTER TOWING APPARATUS

George G. Spratt, West Chester, Pa., assignor, by mesne assignments, to Boeing Airplane Company, Seattle, Wash., a corporation of Delaware Filed June 19, 1957, Ser. No. 666,519

6 Claims. (Cl. 244—3)

This invention relates to aircraft and more particularly to means for towing objects by helicopter and other direct lift type aircraft.

In towing objects on water or along the surface of the earth by a helicopter, the lifting force created by the rotor must be tilted in the forward direction to give a horizontal component thereof equal to or greater than the drag force of the object being towed. A horizontal component of the lift can be produced by tilting the rotor tip path plane, either by cyclic pitch control or other means acting upon the rotor. However, such means cover a range of only a few degrees and therefore result in relatively small horizontal force components. To obtain horizontal force components of magnitude sufficient for towing operations, it has been found necessary to tilt the rotor and hence the helicopter itself.

When the point of attachment of the tow hook to the helicopter is at the center of gravity of the helicopter, the only moment available for tilting the helicopter is that resulting from tilting the lifting force of the rotor. Since this moment is limited by the distance of the rotor hub from the center of gravity of the helicopter and the angle of tilt obtainable by the aforementioned cyclic pitch, it is not of sufficient magnitude to provide adequate control for satisfactory towing operation.

When the point of attachment of the tow hook to the helicopter is not at the center of gravity of the helicopter and the helicopter is tilted for towing, there is only one angle of tilt at which the line of action of the towing force passes through the center of gravity whereby no moment is produced by such force tending to upset the aircraft. At any other angle of tilt, the line of action of the towing force is displaced from the center of gravity and thereby creates a moment tending to change the attitude of the helicopter. Since the only moment available for opposing such upsetting moment is that resulting from tilting the lifting force of the rotor, which is limited as indicated hereinabove, adequate control for safety is not available. Further, such control moment is not of sufficient magnitude to overbalance the moment created by the towing force when it is desired to cease the towing operation and return the helicopter to a horizontal attitude.

Accordingly, it is an object of the present invention to provide means for maintaining adequate control of a helicopter while engaged in towing operations. It is a further object to provide means which function to position the helicopter in towing attitude for towing operation and in horizontal attitude when it is desired to cease the towing operation.

It is a further object to provide a helicopter with a tow bar and means to orientate said bar relative to the pitch, roll and yaw axes of the helicopter. It is a still further object to control said orientating means in response to movements of a control member which controls the direction of the rotor thrust.

Further objects of the invention, as well as advantages thereof, will become apparent from the following description taken in conjunction with the accompanying drawings in which:

Fig. 2 is an enlarged view of the helicopter showing one embodiment of the invention;

Fig. 3 is a plan view showing the helicopter rotor controls;

Figure 1:
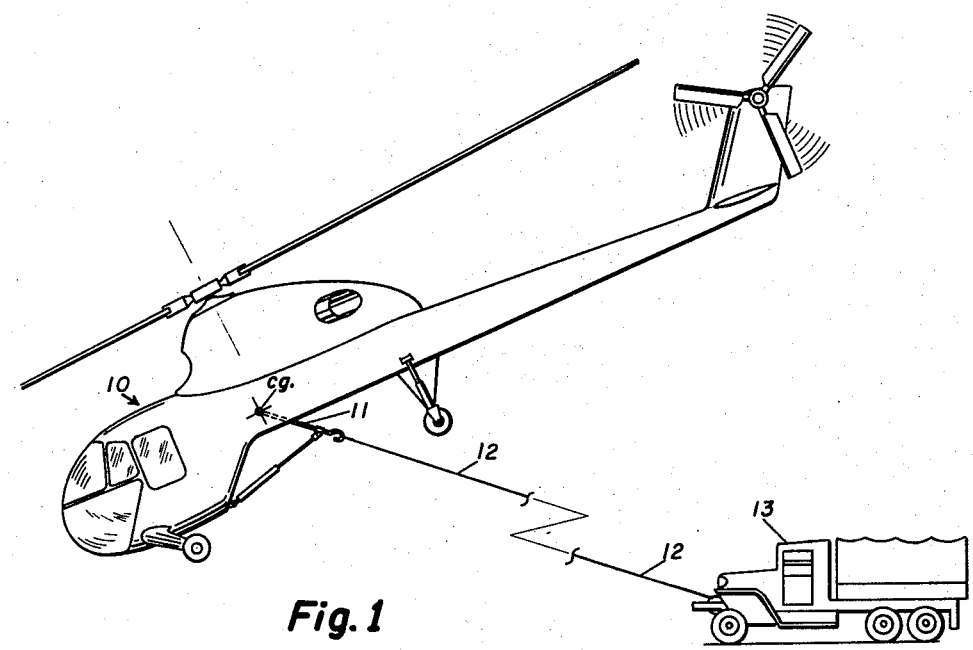
Fig. 1 is a side elevation of a helicopter in towing attitude while towing an object.

As shown in Fig. 1, the helicopter 10 is provided with a tow bar 11 which is attached to the fuselage of the helicopter at the center of gravity thereof and which, during the towing operation, extends downwardly and rearwardly from said attachment point. A tow cable 12 connects the free end of the tow bar with the object 13, shown as a truck, being towed. It will be noted that the line of action of the towing force is along and in the direction of the tow bar thereby passing through the center of gravity and creating no moment tending to upset the helicopter during the towing operation.

Figures 4, 5:
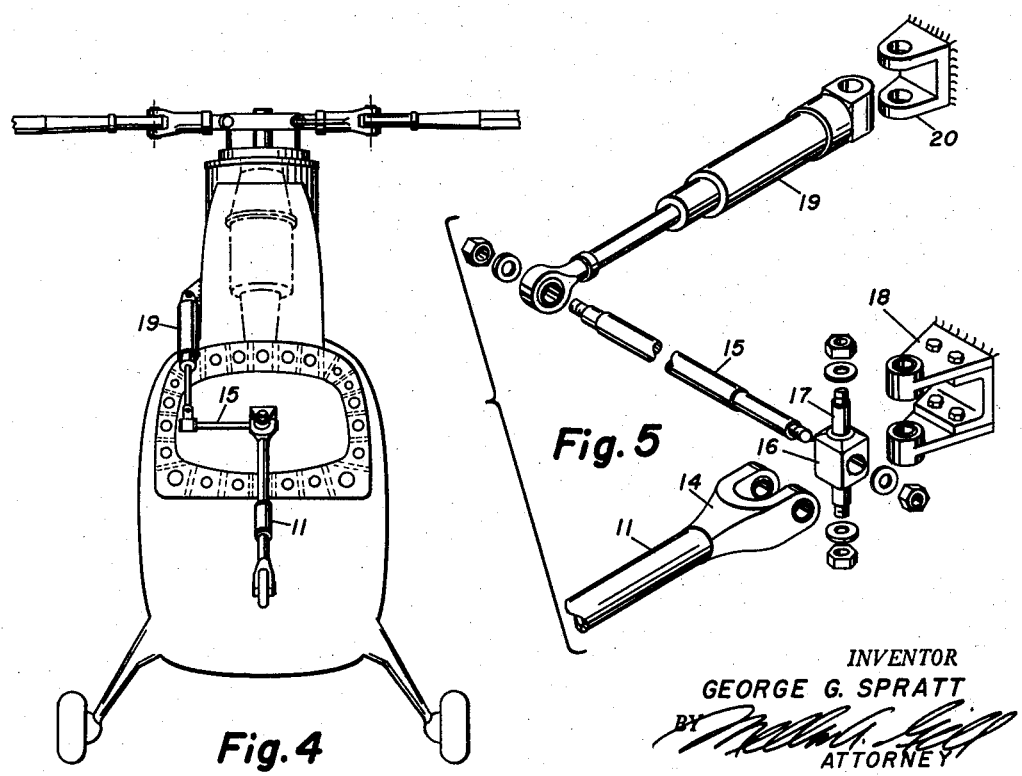
Fig. 4 is a sectional view taken aft of the tow hook mounting.
Fig. 5 is an exploded view of the tow hook mounting.

The tow bar 11, as shown in Fig. 5, is provided at its upper end with a bifurcated fitting 14 by which it is pivotally mounted upon a shaft 15, in turn carried by a trunnion block 16. Block 16 is provided at both ends with trunnions 17 by which it is pivotally mounted to a bracket 18 secured to fixed aircraft structure. One end of shaft 15 is connected to an actuator 19 pivotally mounted on fixed structure by means of a bracket 20 and adapted to react against the fixed structure to position the tow bar 11 about the axis of the trunnions 17. As shown in Fig. 2, the lower end portion of the tow bar 11 is connected to an actuator 21 which is mounted upon fixed aircraft structure for universal movement with respect thereto by means of a bracket 22 and is adapted to react against the fixed structure to position the tow bar 11 about the axis of the shaft 15. Actuators 19 and 21 are provided with control valves 23 and 24, respectively which are supplied with pressure fluid from a source not shown.

Referring now to Figs. 2 and 3, the pilot's controls comprise the usual cyclic stick 25, collective stick 26 and rudder pedals 27. Cyclic stick 25 is pivotally mounted for lateral movement upon a horn 29 carried by a tubular member 28 which is journalled in bearings for rotation about a transverse axis. The lower extension of horn 29 connects to a bellcrank 30 by means of a link 31. Further bellcranks and links operatively connect bellcrank 30 to a swashplate 32 by which the pitch of the rotor blades 33 is controlled in a manner well known in the art and not forming a part of the present invention.

A link 34 extends through tubular member 28 and is attached to the lower end of cyclic stick 25 and at one end to a bellcrank 35. Bellcrank 35, by means of other bellcranks and associated links, is operatively connected to a bell crank 36 which in turn is operatively connected to the swashplate 32. Movement of cyclic stick 25 in the fore and aft direction causes rotation of tubular member 28 and hence a rotation of horn 29 and a displacement of link 31. This causes rotation of bellcrank 30 and through the associated links and bellcranks, tilting of swashplate 32 in a direction to cause tilting of the rotor lifting force in the fore and aft direction.

Lateral movement of cyclic stick 25 causes lateral displacement of link 34 and hence rotation of bellcrank 35. This, through the associated links and bellcranks, causes rotation of bellcrank 36 and hence a tilting of swashplate 32 in a direction to cause tilting of the rotor lifting force in the lateral direction.

A link 37 is pivotally connected at one end to bellcrank 30 and at its other end is pivotally connected to a lever 38 pivotally mounted on the housing of control valve 24. The other end of lever 38 is connected to the valve element of control valve 24 by means of which pressurized fluid is directed to either end of the actuator 21. Similarly, a link 39 is pivotally connected at one end to bellcrank 36 and at its other end is pivotally connected to a lever 40 pivotally mounted on the housing of control valve 23. The other end of lever 40 is pivotally connected to the valve element of control valve 23 by means of which pressurized fluid is directed to either end of the actuator 19.

In operation, movement of the cyclic stick 25 in the fore direction causes, through horn 29 and link 31, counterclockwise rotation of bellcrank 30. In turn, through the associated linkage and swashplate 32, a cyclic pitch change is induced upon the blades 33 to cause a tilting at the rotor tip path plane in the forward direction and hence a tilting of the lift force in the forward direction. Counterclockwise rotation of bellcrank 30, through link 37 and lever 38, also causes a displacement of the control valve element of valve 24 whereby pressurized fluid is admitted to the aft end of actuator 21 to retract the actuator and rotate tow bar 11 relative to the helicopter about shaft 15 in a clockwise direction. The line of action of the towing force will then pass below the center of gravity as shown by the vector $b$ thereby creating a nose-down pitching moment which causes an increase in the forward tilt of the helicopter to an attitude in which the line of action of the towing force as shown by the vector $c$ again passes through the center of gravity. Aft movement of cyclic stick 25 will cause an aft tilt of the rotor tip path plane, and hence an aft tilt of the lifting force, and will cause a displacement of the control valve element of valve 24 to cause an extension of the actuator 21 whereby the tow bar 11 will be rotated relative to the helicopter about shaft 15 in a counterclockwise direction. Since the line of action of the towing force will then pass above the center of gravity, the effect thereof is a decrease in the forward tilt of the helicopter to an attitude in which the line of action of the towing force again passes through the center of gravity. Thus, it is seen that fore and aft movement of the cyclic stick 25 introduces not only a cyclic pitch change to the rotor blades 33 to tilt the rotor lifting force to change the towing attitude of the helicopter, but that there is introduced a force reacting between the towing means and the helicopter which acts in conjunction with the rotor lifting force to change the towing attitude.

Movement of cyclic stick 25 to port causes, through link 34, bellcrank 35 and the associated linkage, counterclockwise rotation of bellcrank 36. In turn, through the associated linkage and swashplate 32, a cyclic pitch to blades 33 is induced to tilt the rotor tip path plane, and hence the lift force, to port. Counterclockwise rotation of bellcrank 36, through link 39 and lever 40, also causes a displacement of the control valve element of valve 23 whereby pressurized fluid is admitted to the aft end of the actuator 19 to retract the actuator and rotate tow bar 11 about the axis of trunnions 17 in a clockwise direction as viewed from above. The effect thereof, since the line of action of the towing force then passes to the left of the center of gravity and at an angle relative to the longitudinal axis of the helicopter, is to cause a combination of roll of the helicopter about its longitudinal axis and turn to port. Similarly, movement of cyclic stick 25 to starboard causes a starboard tilt of the rotor lift force as well as a combination of roll and turn of the helicopter to starboard.

Figure 6:
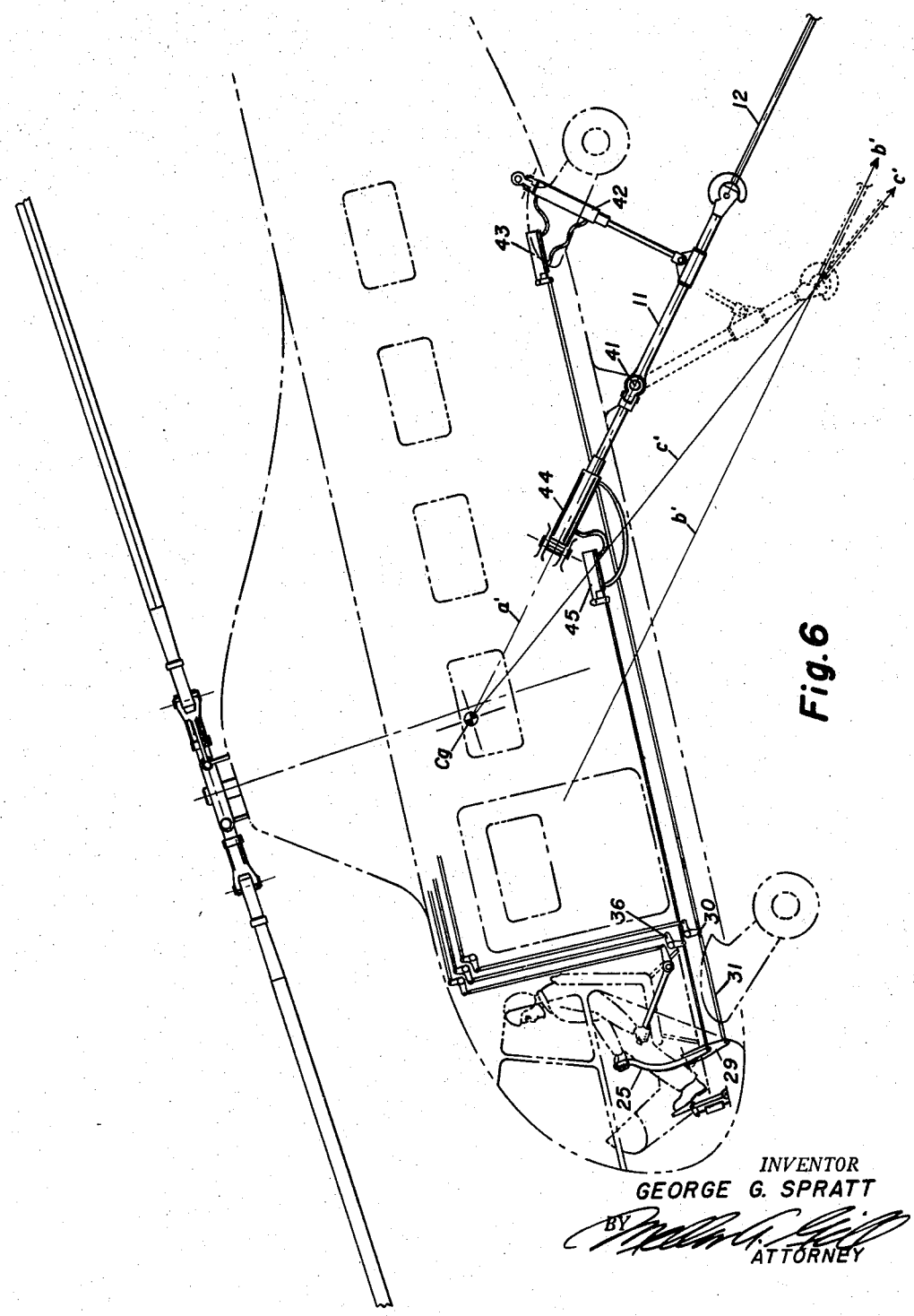
Fig. 6 is an enlarged view of a helicopter showing another embodiment of the invention.

Referring now to Fig. 6, there is shown an embodiment of the invention wherein the point of attachment 41 of the tow bar 11 is not at the helicopter center of gravity, but is positioned below and aft thereof. The helicopter is shown in a towing attitude and it will be noted that the line of action of the towing force, which extends along the tow bar as shown by the vector $a'$, passes through the center of gravity.

The tow bar 11 is mounted in the manner previously described with reference to Fig. 5, and is provided with an actuator 42 for extending and retracting the tow bar 11 about the axis of shaft 15. A control valve 43 controls the admission of pressurized fluid to either end of actuator 42 and is actuated by linkage connected to bellcrank 30 of the cyclic pitch control linkage. Accordingly, movement of cyclic stick 25 in the fore direction, in addition to inducing a cyclic pitch to the rotor blades to tilt the rotor tip path plane in the forward direction, and hence to tilt the lift force in the forward direction, will cause a displacement of the control valve element of valve 43 whereby pressurized fluid is admitted to the upper end of actuator 42 to extend the tow bar 11 to the position shown by the dotted lines. The line of action of the towing force, which is in the direction of the tow cable 12, is thereby displaced from the center of gravity as shown by the vector line $b'$ and thereby creates a nose down pitching moment. This moment causes the helicopter to increase its nose down attitude to a position in which the tow cable is reorientated with respect to the tow bar 11 and the line of action of the towing force again passes through the center of gravity as shown by the vector line $c'$. Similarly, aft movement of cyclic stick 25 will cause retraction of the tow bar 11 whereby the line of action of the towing force will pass above the center of gravity thereby creating a nose-up pitching moment which will cause the helicopter to decrease its nose down attitude until the line of action of the towing force again passes through the center of gravity.

Still referring to Fig. 6, an actuator 44 is mounted to fixed structure and connected to shaft 15 in the manner similar to the connection of actuator 19 to shaft 15 as previously described with reference to Fig. 5. A control valve 45 controls the admission of pressurized fluid to either end of the actuator 44 and is actuated by linkage connected to bellcrank 36 of the cyclic pitch control linkage. Accordingly, movement of cyclic stick 25 to port, in addition to inducing a cyclic pitch to the rotor blades to tilt the rotor tip path plane and hence the lift force to port, will cause a displacement of the control valve element of valve 45 whereby pressurized fluid is admitted to the lower end of the actuator 44 to retract the actuator and rotate the tow bar 11 about the axis of trunnions 17. The line of action of the towing force, being in the direction of the tow cable, is thereby displaced from the center of gravity to create a to-port rolling and turning moment. This moment causes the helicopter to roll and turn to port and to a position in which the tow cable is reorientated with respect to the tow bar 11 and the line of action of the towing force against passes through the center of gravity. Similarly, starboard movement of cyclic stick 25 will cause opposite rotation of tow bar 11 about the axis of trunnions 17, whereby the line of action of the towing force will create a to-starboard rolling and turning moment which will cause the helicopter to roll and turn to starboard until the line of action of the towing force again passes through the center of gravity.

Although shown and described in what is believed to be the most practical and preferred embodiments, it is apparent that departures from the specific apparatus shown will suggest themselves to those skilled in the art and may be made without departing from the spirit and scope of the invention. I therefore do not wish to restrict myself to the particular forms of construction illustrated and described, but desire to avail myself of all modifications that may fall within the scope of the appended claims.

Having thus described my invention, what I claim is:

1. In combination with a helicopter provided with at least one lifting rotor including means for changing the direction of lift thereof, a pilot operated control member operatively connected to said lift direction changing means, towing means pivotally connected to the helicopter, actuator means for positioning said towing means, means for controlling said actuator, and means operatively connecting said pilot operated control member with said actuator control means.

2. In combination with a helicopter provided with at least one lifting rotor including means for changing the direction of lift thereof, a pilot operated control member operatively connected to said lift direction changing means, towing means connected to the helicopter for rotation about axes at right angles to one another, a first actuator for rotating said towing means about one of said axes, a second actuator for rotating said towing means about another of said axes, separate control means for said actuators, and means operatively connecting said pilot operated control member to said actuator control means.

3. In combination with a helicopter provided with at least one lifting rotor including means for changing the direction of lift thereof, a pilot operated control member operatively connected to said lift direction changing means, towing means pivotally connected to the helicopter for rotation with respect thereto about at least one axis, actuator means for positioning said towing means, and control means for said actuator means operatively connected to said pilot operated control member.

4. In combination with a helicopter provided with a lifting rotor including means for changing the direction of lift thereof, a pilot operated control member operatively connected to said lift direction changing means, a tow bar pivotally connected to the helicopter for rotation about a transverse axis and for rotation about an axis at right angles thereto, a first actuator for rotating said tow bar about said transverse axis, a second actuator for rotating said tow bar about said axis at right angles to said transverse axis, control means for said first actuator, and control means for said second actuator, said first actuator control means operatively connected to said pilot operated control member for actuation in response to fore and aft movement of said control member, and said second actuator control means operatively connected to said pilot operated control member for actuation in response to lateral movement of said control member.

5. The combination set forth in claim 4 wherein the tow bar is pivotally connected to the helicopter at the center of gravity thereof.

6. The combination set forth in claim 4 wherein the tow bar is pivotally connected to the helicopter at a point below and aft of the center of gravity thereof.

References Cited in the file of this patent

UNITED STATES PATENTS

| | | |
|---|---|---|
| 2,663,523 | Leisy | Dec. 22, 1953 |

FOREIGN PATENTS

| | | |
|---|---|---|
| 748,059 | Great Britain | Apr. 18, 1956 |